United States Patent
Wang

(10) Patent No.: US 11,108,786 B2
(45) Date of Patent: *Aug. 31, 2021

(54) DATA PROCESSING METHOD AND APPARATUS

(71) Applicant: ADVANCED NEW TECHNOLOGIES CO., LTD., Grand Cayman (KY)

(72) Inventor: Husen Wang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/169,410

(22) Filed: Feb. 6, 2021

(65) Prior Publication Data

US 2021/0203669 A1 Jul. 1, 2021

Related U.S. Application Data

(63) Continuation of application No. 16/780,819, filed on Feb. 3, 2020, now Pat. No. 10,931,684, which is a (Continued)

(30) Foreign Application Priority Data

Nov. 23, 2017 (CN) .......................... 201711185796.2

(51) Int. Cl.
*H04L 29/06* (2006.01)
*H04L 9/32* (2006.01)
(Continued)

(52) U.S. Cl.
CPC ........ *H04L 63/123* (2013.01); *G06F 16/2246* (2019.01); *G06Q 20/3825* (2013.01);
(Continued)

(58) Field of Classification Search
CPC .. G06Q 40/02; G06Q 20/405; G06Q 20/3825; G06F 16/2246; H04L 9/3247;
(Continued)

(56) References Cited

U.S. PATENT DOCUMENTS 9,635,000 B1 4/2017 Muftic
9,749,140 B2 8/2017 Oberhauser et al.
(Continued)

FOREIGN PATENT DOCUMENTS

CN 106487801 A 3/2017
CN 106503994 A 3/2017
(Continued)

OTHER PUBLICATIONS

Written Opinion of the International Searching Authority and International Search Report PCT Application No. PCT/CN2018/109984 dated Jan. 16, 2019 with partial English translation (10 pages).
(Continued)

*Primary Examiner* — Mohammad A Siddiqi

(57) ABSTRACT

A data processing method may include: determining, by a transaction initiation node in a blockchain, transaction data of a transaction and information to be hidden in the transaction data; obtaining, by using the transaction data as an input of a predetermined one-way function, a transaction root of the transaction, and constructing, based on the transaction root, proof data corresponding to the information to be hidden; and, after signing the transaction root, initiating a transaction request to write the transaction root and the proof data on the blockchain, for a node in the blockchain to perform consensus verification on the transaction root and the proof data, and approve or reject the transaction request based on a verification result.

20 Claims, 8 Drawing Sheets

Related U.S. Application Data continuation of application No. PCT/CN2018/109984, filed on Oct. 12, 2018.

(51) Int. Cl.
  *G06F 16/22* (2019.01)
  *G06Q 20/38* (2012.01)
  *G06Q 20/40* (2012.01)
  *G06Q 40/02* (2012.01)

(52) U.S. Cl.
  CPC .......... *G06Q 20/405* (2013.01); *G06Q 40/02* (2013.01); *H04L 9/3221* (2013.01); *H04L 9/3247* (2013.01); *H04L 2209/38* (2013.01)

(58) Field of Classification Search
  CPC .. H04L 63/123; H04L 9/3221; H04L 2209/38
  See application file for complete search history.

(56) References Cited

U.S. PATENT DOCUMENTS

| | | | |
|---|---|---|---|
| 9,774,578 | B1 | 9/2017 | Ateniese et al. |
| 9,849,364 | B2 | 12/2017 | Tran et al. |
| 10,022,613 | B2 | 7/2018 | Tran et al. |
| 10,298,572 | B2 | 5/2019 | Andrade |
| 10,348,707 | B2 | 7/2019 | Ateniese et al. |
| 10,438,198 | B1 | 10/2019 | Griffin et al. |
| 10,931,684 | B2 * | 2/2021 | Wang .................. G06F 16/2246 |
| 2005/0071640 | A1 | 3/2005 | Sprunk et al. |
| 2008/0147563 | A1 | 6/2008 | Yen et al. |
| 2008/0230600 | A1 | 9/2008 | Black et al. |
| 2010/0094760 | A1 | 4/2010 | Gouget et al. |
| 2016/0358165 | A1 | 12/2016 | Maxwell |
| 2017/0148016 | A1 | 5/2017 | Davis et al. |
| 2018/0144114 | A1 | 5/2018 | Fiske et al. |
| 2018/0220278 | A1 * | 8/2018 | Tal ....................... G06Q 20/065 |
| 2018/0331832 | A1 | 11/2018 | Pulsifer |
| 2018/0343114 | A1 | 11/2018 | Ben-Ari |
| 2019/0036712 | A1 | 1/2019 | Qiu |
| 2019/0103973 | A1 | 4/2019 | Chalkias et al. |
| 2019/0149325 | A1 * | 5/2019 | Garagiola ............. H04L 9/3263 380/278 |
| 2019/0149537 | A1 | 5/2019 | Ebrahimi et al. |
| 2019/0158481 | A1 | 5/2019 | Ronda et al. |
| 2019/0207767 | A1 * | 7/2019 | Ahn ........................ H04L 63/00 |
| 2019/0358515 | A1 | 11/2019 | Tran et al. |

FOREIGN PATENT DOCUMENTS

| | | |
|---|---|---|
| CN | 106934619 A | 7/2017 |
| CN | 107274184 A | 10/2017 |
| CN | 107292621 A | 10/2017 |
| CN | 107294709 A | 10/2017 |
| CN | 107360001 A | 11/2017 |
| CN | 108171494 A | 6/2018 |

OTHER PUBLICATIONS

Search Report for Taiwanese Application No. 107132935 dated Sep. 4, 2019 (1 page).
Search Report for European Application No. 18 881 760.5 dated Jun. 12, 2020.
Ian Miers et al., "Zerocoin: Anonymous Distributed E-Cash from Bitcoin", Security and Privacy, 2013 IEEE Symposium on IEEE, May 19, 2013.
Github, "Quorum Whitepager", Nov. 22, 2016.
Andrew Poelstra et al., "Confidential Assets", Bitcoin '17, Apr. 3, 2017.
First Search for Chinese Application No. 201711185796.2 dated Feb. 27, 2020.
Written Opinion for Singaporean Application No. 11202002560P dated May 14, 2021.
Naganuma K. et al., Auditable Zerocoin. 2017 IEEE European Symposium on Security and Privacy Workshops, Apr. 28, 2017, pp. 59-63.
Communication pursuant to Article 94(3) EPC for European Application No. 18 881 760.5 dated Jul. 7, 2021.
Ethan Cecchetti et al., "Solidus: Confidential Distributed Ledger Transactions via PVORM", IACR, Apr. 10, 2017.

* cited by examiner

DATA PROCESSING METHOD AND APPARATUS

CROSS-REFERENCE TO RELATED APPLICATIONS

This application is a continuation application of U.S. patent application Ser. No. 16/780,819, filed Feb. 3, 2020, which is continuation application of International Patent Application No. PCT/CN2018/109984, filed on Oct. 12, 2018, which claims priority to and benefits of the Chinese Patent Application No. 201711185796.2, filed on Nov. 23, 2017. The contents of the above-referenced applications are incorporated herein by reference in their entirety.

TECHNICAL FIELD

The present invention relates to the field of computer technologies, and in particular, to a data processing method and apparatus.

BACKGROUND

A "blockchain" technology is a special distributed database technology originally designed by a person using the name "Satoshi Nakamoto" for a digital currency, Bitcoin. The blockchain is suitable to store simple and sequential data that can be verified within the system. It also ensures, based on cryptography and a consensus algorithm, that the stored data cannot be tampered with or forged and is public and transparent across the network.

Because an asset and a transaction record in each account are public, when an account address of an account is obtained by using any other account, all assets and historical transactions in the account can be obtained by querying the blockchain.

It is necessary to provide a more reliable solution.

SUMMARY

Embodiments of the present specification provide a data processing method and apparatus, to resolve a problem that an existing blockchain technology is prone to a data leakage.

An embodiment of the present specification provides a data processing method, including: determining, by a transaction initiator, information to be hidden in transaction data; obtaining, by using the transaction data as an input of a predetermined one-way function, a transaction root that is output by the predetermined one-way function; constructing, according to the transaction root, proof data of validity of the information to be hidden; and initiating a transaction request to write the proof data and the transaction root carrying a signature of the transaction initiator to a blockchain, for a node in the blockchain to perform consensus verification on the transaction root and the proof data, and approve or reject the transaction request according to a verification result.

In some embodiments, before using the transaction data as the input of the predetermined one-way function, the method further includes: determining pre-transaction data and post-transaction data in the transaction data, and obtaining, by using the transaction data as the input of the predetermined one-way function, the transaction root that is output by the predetermined one-way function includes: obtaining, by using the pre-transaction data as an input of a first predetermined one-way function, an input transaction root that is output by the first predetermined one-way function; obtaining, by using the post-transaction data as an input of a second predetermined one-way function, an output transaction root that is output by the second predetermined one-way function; and using the obtained input transaction root and output transaction root as to-be-chained transaction roots.

In some embodiments, obtaining, by using the post-transaction data as the input of a second predetermined one-way function, the output transaction root that is output by the second predetermined one-way function includes: constructing, according to the post-transaction data and a random number, a bottom layer of a predetermined one-way function tree, and determining an output transaction root corresponding to a top layer of the predetermined one-way function tree.

In some embodiments, constructing, according to the transaction root, proof data of validity of the information to be hidden includes: performing, by using the transaction root and the information to be hidden as inputs, a predetermined logical operation; and performing, by using the information to be hidden as a protected object, a zero-knowledge proof on the logical operation to obtain the proof data.

An embodiment of the present specification provides a data processing method, including: receiving a transaction request from a transaction initiator, where the transaction request is used to request to write a transaction root and proof data on a blockchain, the transaction root is obtained by using transaction data as an input of a predetermined one-way function, and the proof data is used to prove information to be hidden in the transaction data; performing verification on the transaction root, to obtain a first verification result; performing, according to the transaction root, verification on the proof data to obtain a second verification result; and, approving or rejecting the transaction request according to the first verification result and the second verification result.

In some embodiments, performing verification on the transaction root includes: verifying whether the transaction root has a valid signature.

In some embodiments, verifying whether the transaction root has a valid signature includes: determining an address associated with an output transaction root in the transaction root, where the output transaction root is constructed according to post-transaction data in the transaction data; and verifying, if determining that a quantity of obtained addresses is 1, whether the transaction root has a signature corresponding to the transaction initiator.

In some embodiments, performing verification on the transaction root includes: verifying whether an output transaction root in the transaction root is the same as an already-chained output transaction root and input transaction root, where the output transaction root is constructed according to post-transaction data in the transaction data.

In some embodiments, performing verification on the transaction root includes: verifying whether an input transaction root in the transaction root is the same as an already-chained output transaction root and input transaction root, where the input transaction root is constructed according to pre-transaction data in the transaction data.

In some embodiments, approving or rejecting the transaction request according to the first verification result and the second verification result includes: if the first verification result and the second verification result both are successful, writing, in response to the transaction request, the transaction root carrying a signature of the transaction initiator and the proof data on the blockchain; or if the first verification result and/or the second verification result is failed, rejecting the transaction request.

An embodiment of the present specification provides a data processing method, including: determining, by a transaction initiator, information to be hidden in transaction data; obtaining, by using the transaction data as an input of a predetermined one-way function, a transaction root that is output by the predetermined one-way function; constructing, according to the transaction root, proof data of validity of the information to be hidden; and sending the transaction root and the proof data to a transaction receiver, for the transaction receiver to perform verification on the transaction root; and initiates, after the verification succeeds, a transaction request to write the proof data and the transaction root carrying signatures of the transaction initiator and the transaction receiver on a blockchain.

An embodiment of the present specification provides a data processing method, including: receiving, by a transaction receiver, a transaction root and proof data from a transaction sender, where the transaction root is obtained by using transaction data as an input of a predetermined one-way function, and the proof data is used to prove information to be hidden in the transaction data; performing verification on the transaction root according to the information to be hidden and the predetermined one-way function; and if a verification result is successful, initiating a transaction request to write the proof data and the transaction root carrying signatures of the transaction initiator and the transaction receiver on a blockchain, for a node in the blockchain to perform consensus verification on the transaction root and the proof data, and approve or reject the transaction request according to a verification result.

An embodiment of the present specification provides a data processing method, including: receiving a transaction request from a transaction receiver, where the transaction request is used to request to write a transaction root and proof data on a blockchain, the transaction root is obtained by using transaction data initiated by a transaction initiator as an input of a predetermined one-way function, and the proof data is used to prove information to be hidden in the transaction data; performing verification on the transaction root, to obtain a first verification result; performing, according to the transaction root verification on the proof data to obtain a second verification result; and approving or rejecting the transaction request according to the first verification result and the second verification result.

In some embodiments, performing verification on the transaction root includes: determining an address associated with an output transaction root in the transaction root, where the output transaction root is constructed according to post-transaction data in the transaction data; and if determining that a quantity of obtained addresses is greater than or equal to a predetermined threshold, verifying whether the transaction root carries signatures corresponding to the transaction initiator and the transaction receiver.

An embodiment of the present specification provides a data processing apparatus, including: a determining unit, configured to determine information to be hidden in transaction data; a processing unit, configured to obtain, by using the transaction data as an input of a predetermined one-way function, a transaction root that is output by the predetermined one-way function, and construct, according to the transaction root, proof data of validity of the information to be hidden; and an initiation unit, configured to initiate a transaction request to write the proof data and the transaction root carrying a signature of the transaction initiator on a blockchain, for a node in the blockchain to perform consensus verification on the transaction root and the proof data, and approve or reject the transaction request according to a verification result.

In some embodiments, the determining unit is further configured to determine pre-transaction data and post-transaction data in the transaction data, and the processing unit is configured to: obtain, by using the pre-transaction data as an input of a first predetermined one-way function, an input transaction root that is output by the first predetermined one-way function; obtain, by using the post-transaction data as an input of a second predetermined one-way function, an output transaction root that is output by the second predetermined one-way function, and use the obtained input transaction root and output transaction root as to-be-chained transaction roots.

In some embodiments, the processing unit is further configured to construct, according to the post-transaction data and a random number, a bottom layer of a predetermined one-way function tree, and determine an output transaction root corresponding to a top layer of the predetermined one-way function tree.

In some embodiments, the processing unit is further configured to perform a predetermined logical operation by using the transaction root and the information to be hidden as inputs; and perform, by using the information to be hidden as a protected object, a zero-knowledge proof on the logical operation to obtain the proof data.

An embodiment of the present specification provides a data processing apparatus, including: a receiving unit, configured to receive a transaction request from a transaction initiator, where the transaction request is used to request to write a transaction root and proof data to a blockchain, the transaction root is obtained by using transaction data as an input of a predetermined one-way function, and the proof data is used to prove information to be hidden in the transaction data; a verification unit, configured to perform verification on the transaction root to obtain a first verification result, and perform, according to the transaction root, verification on the proof data to obtain a second verification result; and a response unit, configured to approve or reject the transaction request according to the first verification result and the second verification result.

In some embodiments, the verification unit is configured to verify whether the transaction root has a valid signature.

In some embodiments, the verification unit is further configured to determine an address associated with an output transaction root in the transaction root, where the output transaction root is constructed according to post-transaction data in the transaction data; and if determining that a quantity of obtained addresses is 1, verify whether the transaction root has a signature corresponding to the transaction initiator.

In some embodiments, the verification unit is further configured to verify whether an output transaction root in the transaction root is the same as an already-chained output transaction root and input transaction root, where the output transaction root is constructed according to post-transaction data in the transaction data.

In some embodiments, the verification unit is configured to verify whether an input transaction root in the transaction root is the same as an already-chained output transaction root and input transaction root, where the input transaction root is constructed according to pre-transaction data in the transaction data.

In some embodiments, the response unit is further configured to: if the first verification result and the second verification result both are successful, write, in response to the transaction request, the transaction root carrying a signature of the transaction initiator and the proof data on the blockchain; or if the first verification result or the second verification result is failed, reject the transaction request.

An embodiment of the present specification provides a data processing apparatus, including: a determining unit, configured to determine, by a transaction initiator, information to be hidden in transaction data; a processing unit, configured to obtain, by using the transaction data as an input of a predetermined one-way function, a transaction root that is output by the predetermined one-way function, and construct, according to the transaction root, proof data of validity of the information to be hidden; and a sending unit, configured to send the transaction root and the proof data to a transaction receiver, for the transaction receiver to perform verification on the transaction root, and after the verification succeeds, initiates a transaction request to write the proof data and the transaction root carrying signatures of the transaction initiator and the transaction receiver on a blockchain.

An embodiment of the present specification provides a data processing apparatus, including: a receiving unit, configured to receive a transaction root and proof data from a transaction sender, where the transaction root is obtained by using transaction data as an input of a predetermined one-way function, and the proof data is used to prove information to be hidden in the transaction data; a verification unit, configured to perform verification on the transaction root according to the information to be hidden and the predetermined one-way function; and an initiation unit, configured to: if a verification result is successful, initiate a transaction request to write the proof data and the transaction root carrying signatures of the transaction initiator and the transaction receiver on a blockchain, for a node in the blockchain to perform consensus verification on the transaction root and the proof data, and approve or reject the transaction request according to a verification result.

An embodiment of the present specification provides a data processing apparatus, including: a receiving unit, configured to receive a transaction request from a transaction receiver, where the transaction request is used to request to write a transaction root and proof data on a blockchain, the transaction root is obtained by using transaction data initiated by a transaction initiator as an input of a predetermined one-way function, and the proof data is used to prove information to be hidden in the transaction data; a verification unit, configured to perform verification on the transaction root, to obtain a first verification result, and perform, according to the transaction root, verification on the proof data to obtain a second verification result; and a response unit, configured to approve or reject the transaction request according to the first verification result and the second verification result.

In some embodiments, the verification unit is further configured to determine an address associated with an output transaction root in the transaction root, where the output transaction root is constructed according to post-transaction data in the transaction data; and if determining that a quantity of obtained addresses is greater than or equal to a predetermined threshold, verify whether the transaction root carries signatures corresponding to the transaction initiator and the transaction receiver.

An embodiment of the present specification provides a data processing apparatus, including: a processor; and a memory configured to store a computer executable instruction, where when executed, the executable instruction enables the processor to perform the following operations: determining information to be hidden in transaction data; obtaining, by using the transaction data as an input of a predetermined one-way function, a transaction root that is output by the predetermined one-way function; constructing, according to the transaction root, proof data of validity of the information to be hidden; and initiating a transaction request to write the proof data and the transaction root carrying a signature of the transaction initiator on a blockchain, for a node in the blockchain to perform consensus verification on the transaction root and the proof data, and approve or reject the transaction request according to a verification result.

An embodiment of the present specification provides a data processing apparatus, including: a processor; and a memory configured to store a computer executable instruction, where when executed, the executable instruction enables the processor to perform the following operations: receiving a transaction request sent by a transaction initiator, where the transaction request is used to request to write a transaction root and proof data on a blockchain, the transaction root is obtained by using transaction data as an input of a predetermined one-way function, and the proof data is used to prove information to be hidden in the transaction data; performing verification on the transaction root, to obtain a first verification result; performing, according to the transaction root, verification on the proof data, to obtain a second verification result; and approving or rejecting the transaction request according to the first verification result and the second verification result.

An embodiment of the present specification provides a data processing apparatus, including: a processor; and a memory configured to store a computer executable instruction, where when executed, the executable instruction enables the processor to perform the following operations: determining information to be hidden in transaction data; obtaining, by using the transaction data as an input of a predetermined one-way function, a transaction root that is output by the predetermined one-way function, and constructing, according to the transaction root, proof data of validity of the information to be hidden; and sending the transaction root and the proof data to a transaction receiver, wherein the transaction receiver performs verification on the transaction root, and after the verification succeeds, initiates a transaction request to write the proof data and the transaction root carrying signatures of the transaction initiator and the transaction receiver on a blockchain.

An embodiment of the present specification provides a data processing apparatus, including: a processor; and a memory configured to store a computer executable instruction, where when executed, the executable instruction enables the processor to perform the following operations: receiving a transaction root and proof data from a transaction sender, where the transaction root is obtained by using transaction data as an input of a predetermined one-way function, and the proof data is used to prove information to be hidden in the transaction data; performing verification on the transaction root according to the information to be hidden and the predetermined one-way function; and if a verification result is successful, initiating a transaction request to write the proof data and the transaction root carrying signatures of the transaction initiator and the transaction receiver on a blockchain, for a node in the blockchain to perform consensus verification on the transaction root and the proof data, and approve or reject the transaction request according to the verification result.

An embodiment of the present specification provides a data processing apparatus, including: a processor; and a memory configured to store a computer executable instruction, where when executed, the executable instruction enables the processor to perform the following operations: receiving a transaction request from a transaction receiver, where the transaction request is used to request to write a transaction root and proof data on a blockchain, the transaction root is obtained by using transaction data initiated by a transaction initiator as an input of a predetermined one-way function, and the proof data is used to prove information to be hidden in the transaction data; performing, according to the transaction root, verification on the transaction root, to obtain a first verification result, and performing verification on the proof data to obtain a second verification result; and approving or rejecting the transaction request according to the first verification result and the second verification result.

The foregoing at least one technical solution used in the embodiments of the present specification can achieve the following beneficial effects:

As can be seen, in the embodiments, at first, the one-way function is used to ensure that the transaction data is authentic and cannot be tampered with. Then the proof data is constructed to prove validity of the information to be hidden without revealing any information to be hidden to a non-transaction participant. Compared with a solution in existing technologies in which a data leakage of any node causes a leakage of all data, in the embodiments, only data of the node is leaked, and an attacker still cannot view private data of other nodes. Therefore, data security of the blockchain can be improved.

BRIEF DESCRIPTION OF THE DRAWINGS

Accompanying drawings described herein are used to provide further understanding about the present invention, and constitute one portion of present invention. Exemplary embodiments of the present invention and their descriptions are used to explain the present invention, and do not constitute an inappropriate limitation on the present invention. In the figures.

DETAILED DESCRIPTION OF THE INVENTION

To make the objectives, technical solutions, and advantages of the present invention clearer, the technical solutions of the present invention will be described below with reference to embodiments of the present invention and corresponding accompanying drawings. Apparently, the described embodiments are merely a part rather than all of the embodiments of the present invention. All other embodiments obtained by a person of ordinary skill in the art based on the embodiments of the present invention without creative effects shall fall within the protection scope of the present invention.

It should be noted that, according to a one-way function, it is easy to calculate $f(x)=y$ for any x in the domain of f, but for any y in the codomain of f, it is impossible to calculate x so that $y=f(x)$. That is, it is easy to calculate an output for any input, but it is difficult to deduce the input from the output.

In a zero-knowledge proof, a prover enables a verifier to believe that some inference is correct without providing any useful information (protected/hidden information) to the verifier.

Figure 1A:
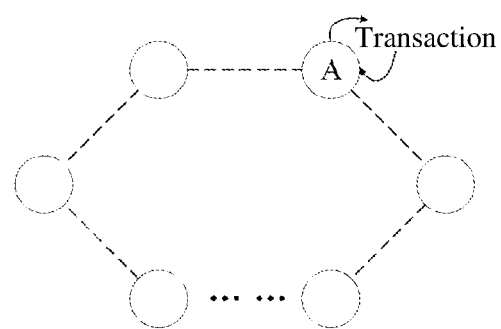
FIG. 1a and FIG. 1b are schematic diagrams of application scenarios of a data processing method, according to an embodiment of the present specification.

Referring to FIG. 1a, an application scenario of the present invention may be as follows: A node A on a blockchain may need to transfer some money from a first account of a transaction initiator corresponding to the node A to a second account of the transaction initiator, or merge the first account and the second account. Before requesting to write the transfer/merging in a form of a transaction on the blockchain, the node A first determines information to be hidden, for example, inputs (such as pre-transaction balances) and outputs (such as post-transaction balances) of the first account and the second account, in transaction data of the transaction. Next, the node A may calculate a transaction root of the transaction, and constructs, based on the transaction root, proof data of the information to be hidden, to prove validity, authenticity, and other information to be hidden. Finally, the node A may request to write the transaction root and the proof data in a form of a transaction on the blockchain.

Though blockchain may allow one person to apply for a plurality of accounts, according to a signature mechanism of the blockchain, each person is allocated a unique corresponding signature. Therefore, when a transaction occurs between different accounts of a person A, the transaction requires only a signature of A.

Figure 1B:
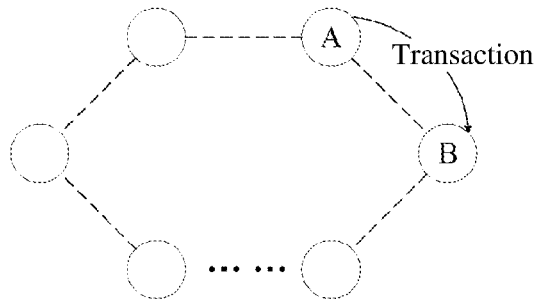

Referring to FIG. 1b, another application scenario of the present invention may be as follows: A node A on a blockchain may need to transfer some money from a transaction initiator to a transaction receiver corresponding to a node B. Before requesting to write the transfer in a form of a transaction on the blockchain, the node A first determines information to be hidden (e.g., inputs and outputs of the transaction initiator, the transaction receiver and balances of the transaction initiator and the transaction receiver) in transaction data of the transaction. Next, the node A may calculate a transaction root of the transaction, and construct, based on the transaction root, proof data of the information to be hidden, to prove validity, authenticity, and other information to be hidden. Finally, the node A may send the transaction root and the proof data to the transaction receiver, for the transaction receiver to perform verification on the transaction root. If the verification succeeds, after signing the transaction root, the transaction receiver may initiate a transaction request to write the proof data and the transaction root carrying signatures of the transaction initiator and the transaction receiver on the blockchain. Alternatively, after signing the transaction root, the transaction receiver may return the signed transaction root plus a verification result to the transaction initiator, to instruct the transaction initiator to initiate a transaction request to write the proof data and the transaction root carrying signatures of the transaction initiator and the transaction receiver on the blockchain.

In the above-mentioned two scenarios, the transfer or merging is an example for ease of understanding the "transaction." In fact, the "transaction" may alternatively be recording a piece of information in the node A, sending a piece of information to the node B from the node A, etc. Correspondingly, the "information to be hidden" may be set freely. For example, the "information to be hidden" may be, but not limited to, balances of the transaction between the two parties.

Technical solutions provided in embodiments of the present invention are described below in detail with reference to the drawings.

Figure 2:
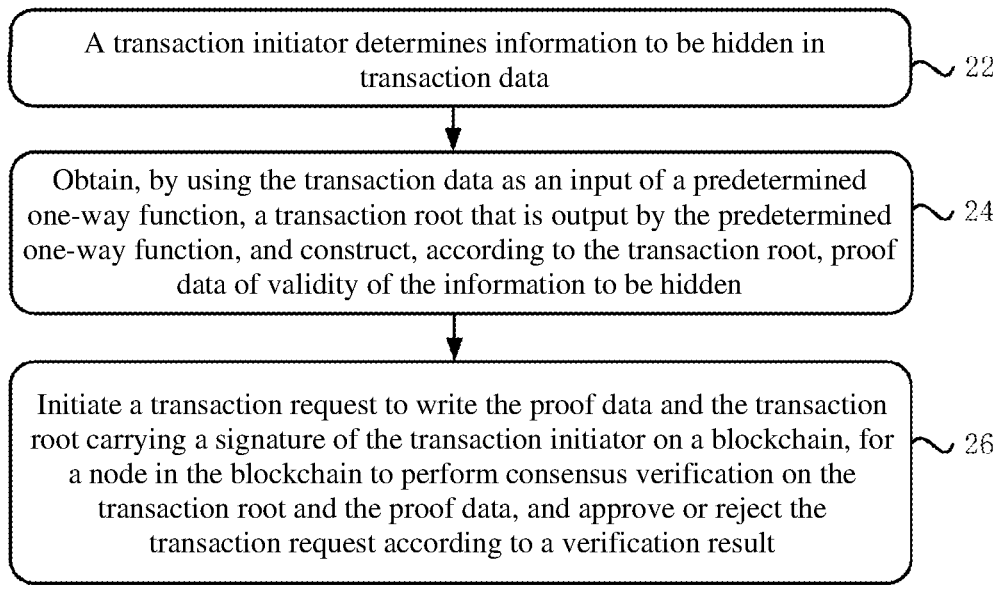
FIG. 2 is a flowchart of a data processing method, according to an embodiment of the present specification.

Referring to FIG. 2, FIG. 2 is a schematic flowchart of a data processing method, according to an embodiment of the present specification. The method may be performed by a participated transaction node in a blockchain, including the following steps.

At step 22, a transaction initiator may determine information to be hidden in transaction data. An implementation of step 22 may be as follows: A node may obtain a transaction inventory completed by a transaction initiator (user). The transaction inventory may record an item and content corresponding to the item, for example, a payee, a payer, pre-transaction and post-transaction balances of the payee, and pre-transaction and post-transaction balances of the payer. Next, the node may select corresponding information from the transaction inventory based on a predetermined hiding rule.

The hiding rule may be: determining, based on a preset hidden item, an item in the transaction inventory corresponding to the hidden item and content of the item as information to be hidden. For example, the hidden item may include the pre-transaction and post-transaction balances of the payee and the pre-transaction and post-transaction balances of the payer. In some embodiments, the hiding rule may be: selecting data corresponding to a specific key word from the transaction inventory based on a preset screening rule. For example, if the specific key word is "balance" or "transaction amount," a corresponding number is selected, and is used as information to be hidden.

Another implementation of step 22 may be as follows: when completing a transaction inventory, a transaction initiator may customize and label data to be hidden in the transaction inventory. For example, pre-transaction and post-transaction balances of a payee and pre-transaction and post-transaction balances of a payer are labeled. After obtaining the transaction inventory completed by the transaction initiator, a node may determine information to be hidden in transaction data based on the label.

At step 24, the method may include obtaining, by using the transaction data as an input of a predetermined one-way function, a transaction root that is output by the predetermined one-way function, and construct, according to the transaction root, proof data of validity of the information to be hidden. An implementation of constructing a transaction root in step 24 may be as follows: First, the node may analyze the transaction data based on the transaction inventory corresponding to the transaction data, to determine pre-transaction data and post-transaction data in the transaction data. For example, the pre-transaction and post-transaction balances of the payee and the pre-transaction and post-transaction balances of the payer may be determined. Next, the node may obtain, by using the pre-transaction data as an input of a first predetermined one-way function, an input transaction root that is output by the first predetermined one-way function; and obtain, by using the post-transaction data as an input of a second predetermined one-way function, an output transaction root that is output by the second predetermined one-way function. The first predetermined one-way function and the second predetermined one-way function may be the same one-way function.

The one-way function may be a one-way function tree. Correspondingly, the step of constructing an input transaction root or output transaction root may be: constructing a bottom layer of a predetermined one-way function tree according to the pre-transaction and post-transaction data and a random number, and determining an input transaction root output transaction root corresponding to a top layer of the predetermined one-way function tree. For example, a random number of a fixed length is added behind the balance of the pre-transaction and post-transaction. For example, when a 128-bit number is defined, the first 10 bits may represent the balance, and bits behind may represent a random number.

There are at least one input transaction root and at least one output transaction root. For example, in rootA (a leaf node A has an account balance 100), rootB (a leaf node B has an account balance 800), rootA' (the leaf node A has an account balance 50), rootB' (the leaf node B has an account balance 950), rootA and rootB are input transaction roots, and rootA' and rootB' are output transaction roots. In addition, the random number is added during the transaction root construction to distinguish each input transaction root and output transaction root, to prevent a collision subsequently when a consensus node performs verification on the input transaction root and output transaction root.

An implementation of constructing proof data in step 24 may be as follows: a predetermined logical operation is performed by using the transaction root and the information to be hidden as inputs; and a zero-knowledge proof is performed on the logical operation by using the information to be hidden as a protected object, to obtain the proof data. The predetermined logical operation may be a particular function customized according to content to be proved. For example, when a transaction between a first account and a second account of the transaction initiator requires to be proved, the particular function may perform calculation by using a transaction root and information to be hidden as inputs, to determine whether pre-transaction balances of the first account and the second account are the same as post-transaction balances of the first account and the second account, a difference between a pre-transaction balance and an post-transaction balance does not exceed n dollars, or interest of the second account after the transaction is increased, etc. Next, a proof is output for an entire function operation process in a zero-knowledge proof manner, to prove that the hidden information may be used to calculate a particular function.

At step 26, the method may include initiating a transaction request to write the proof data and the transaction root carrying a signature of the transaction initiator on a blockchain, for a node in the blockchain to perform consensus verification on the transaction root and the proof data, and approving or rejecting the transaction request according to a verification result.

Accordingly, in this embodiment, at first, the one-way function is used to ensure that the transaction data is authentic and cannot be tampered with. Next, the proof data is constructed to prove validity of the information to be hidden without revealing any information to be hidden to a non-transaction participant. Compared with existing technologies, this embodiment may be effectively prevent data privacy of the entire blockchain from being affected by a data leakage of any node, and improve data security of the blockchain.

Figure 3:
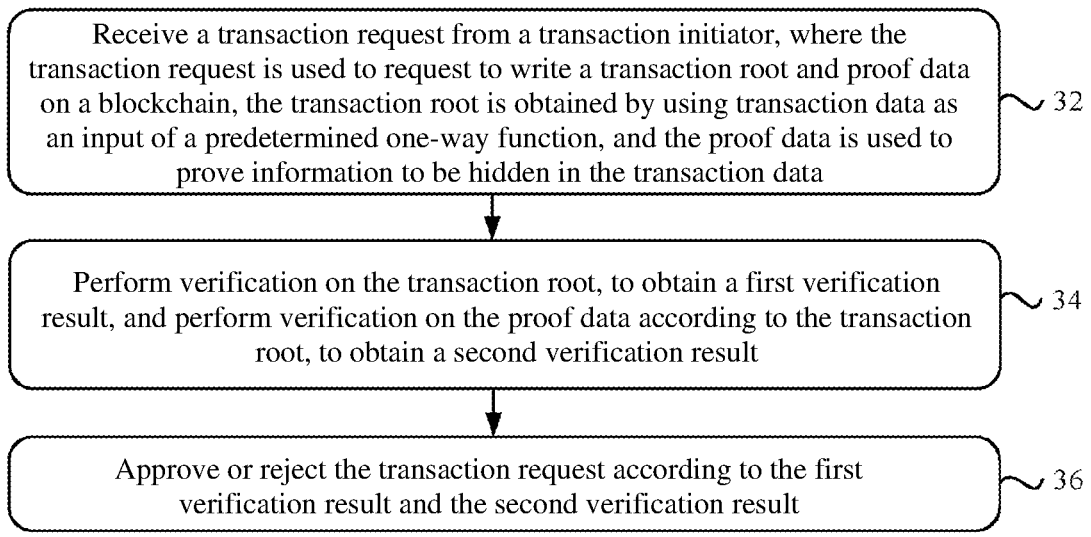
FIG. 3 is a flowchart of a data processing method, according to an embodiment of the present specification.

Referring now to FIG. 3, FIG. 3 is a schematic flowchart of a data processing method, according to an embodiment of the present specification. The method may be performed by a consensus node in a blockchain, including the following steps.

At step 32, the method may include receiving a transaction request from a transaction initiator. The transaction request may be a request to write a transaction root and proof data on a blockchain. The transaction root is obtained by using transaction data as an input of a predetermined one-way function, and the proof data is used to prove information to be hidden in the transaction data. Step 32 may be a step performed based on the embodiments shown in FIG. 2. Details of the transaction request, the transaction root, and the proof data in this step can be referred to relevant descriptions in as mentioned above, and thus, are not described herein again.

At step 34, the method may include performing verification on the transaction root to obtain a first verification result, and performing, according to the transaction root, verification on the proof data to obtain a second verification result. An implementation of performing verification on the transaction root in step 34 may be as follows: verifying whether the transaction root has a valid signature. If the transaction root has a valid signature, the first verification result is successful. If the transaction root does not have a valid signature, the first verification result is failed.

Particularly, an address associated with an output transaction root in the transaction root may be first determined. The output transaction root may be constructed according to post-transaction data in the transaction data. If it is determined that a quantity of obtained addresses is 1, whether the transaction root has a signature corresponding to the transaction initiator will be verified.

In some embodiments, each output transaction root may correspond to an address hash(pk), and the number of transaction participants may be determined based on the addresses; next, whether the transaction root has valid signatures of all participants will be verified. For example, when there is only one address, the transaction may be considered as a transaction between different accounts of the same user. Furthermore, if a signature of the user is verified to be correct, the first verification result is determined to be successful. In addition, the signature verification is related to a digital signature mechanism of the blockchain, which is not limited herein.

Another implementation of performing verification on the transaction root in step 34 may be as follows: based on the foregoing implementation of performing verification on the transaction root in step 34, this implementation may further include: verifying whether the output transaction root in the transaction root is the same as an already-chained output transaction root and input transaction root. If the output transaction root in the transaction root is the same as the already-chained output transaction root or input transaction root, the first verification result is determined to be failed. If the output transaction root in the transaction root is different from the already-chained output transaction root and input transaction root, and has a valid signature, the first verification result is determined to be successful.

Specifically, the purpose of verifying the output transaction root is to avoid a "collision." The "collision" herein may be understood as follows: an input transaction root or an output transaction root is the same as the output transaction root, and both have the same (user) signature. Consequently, it cannot be determined that "money" corresponding to the transaction root is the "money" the user has not "spent" or the "money" the user has "spent."

When the output transaction root is constructed, a random number is added to the post-transaction data. Therefore, the obtained output transaction root is unique. Accordingly, the output transaction root herein may be compared with the already-chained output transaction root and input transaction root to determine whether the output transaction root is the same as the already-chained output transaction root and input transaction root, and whether a collision occurs based on a comparison result.

Another implementation of performing verification on the transaction root at step 34 may be as follows: based on the foregoing implementation, verifying whether an input transaction root in the transaction root is the same as the already-chained output transaction root and input transaction root. The input transaction root may be constructed according to pre-transaction data in the transaction data. In this implementation, the purpose of the input transaction root is to avoid a "dual payment." The "dual payment" herein may be understood as follows: The user pays "money" corresponding to the input transaction root to other two users. Details of an avoidance manner is similar to the output transaction root verification manner, and thus, are not described herein again.

For the latter two implementations of step 34, the node may distinguish the input transaction root and the output transaction root in the following manner: An unspent transaction output (UTXO) of a transaction root is an input transaction root, and others are output transaction roots.

In some embodiments, an implementation of performing verification on the proof data in step 34 may be as follows: the consensus node may perform verification on the proof data based on the transaction root by using a zero-knowledge proof algorithm. If the verification succeeds, it is determined that the proof data is correct.

At step 36, the method may include approving or rejecting the transaction request according to the first verification result and the second verification result. It should be noted that, if the first verification result and the second verification result both are successful, in response to the transaction request, the transaction root carrying a signature of the transaction initiator and the proof data may be written on the blockchain; if the first verification result or the second verification result is failed, the transaction request may be rejected.

Accordingly, in this embodiment, at first, the one-way function may be used to ensure that the transaction data is authentic and cannot be tampered with. Next, the proof data may be constructed to prove validity of the information to be hidden without revealing any information to be hidden to a non-transaction participant. Compared with existing technologies, this embodiment can effectively prevent data privacy of the entire blockchain from being affected by a data leakage of any node, and improve data security of the blockchain.

Figure 4:
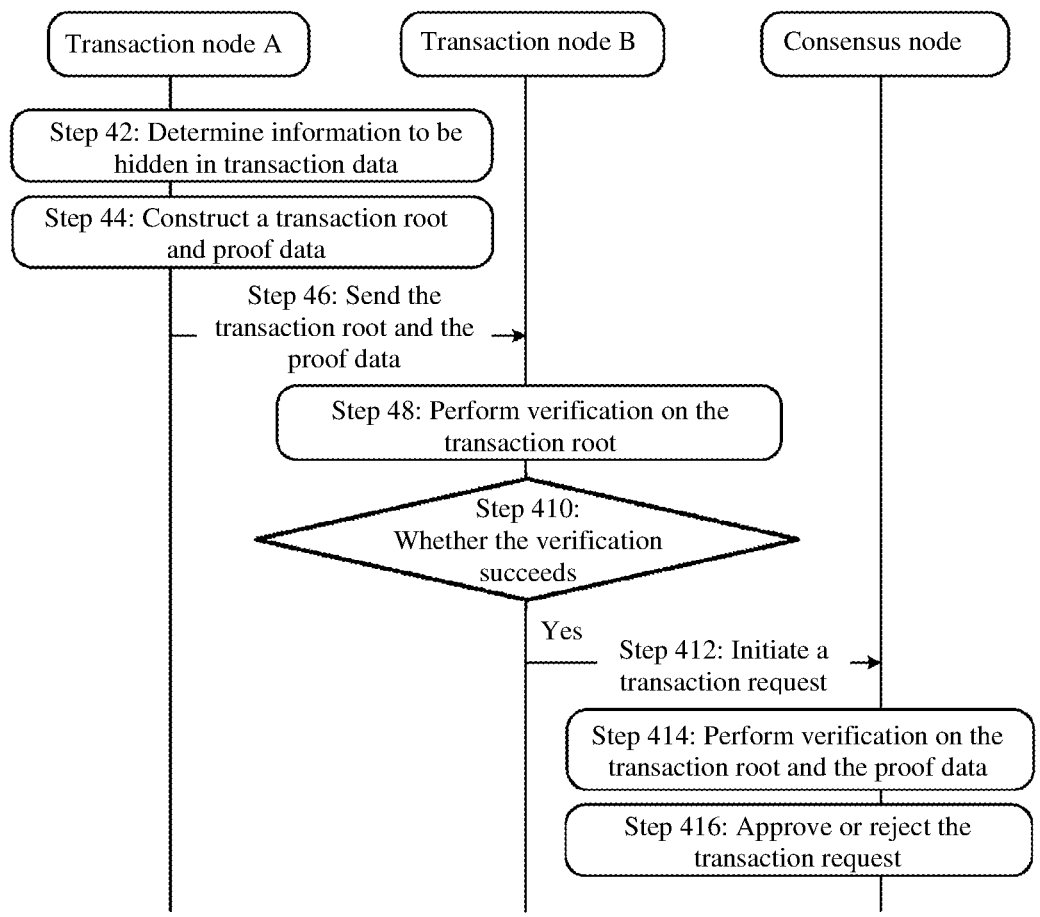
FIG. 4 is a schematic flowchart of a data processing method, according to an embodiment of the present specification.

Referring now to FIG. 4, FIG. 4 is a schematic flowchart of a data processing method, according to an embodiment of the present specification. Referring to FIG. 4, the method may be performed by a node in a blockchain, including the following steps.

At step 42, a transaction node A (a transaction initiator) may determine information to be hidden in transaction data.

At step 44, the transaction node A may obtain, by using the transaction data as an input of a predetermined one-way function, a transaction root that is output by the predetermined one-way function, and constructs, according to the transaction root, proof data of validity of the information to be hidden.

At step 46, the transaction node A may send the transaction root and the proof data to a transaction node B (a transaction receiver), for the transaction receiver to perform verification on the transaction root, and after the verification succeeds, initiates a transaction request to write the proof data and the transaction root carrying signatures of the transaction initiator and the transaction receiver on a blockchain.

At step 48, the transaction node B may perform verification on the transaction root according to the information to be hidden and the predetermined one-way function.

At step 410, the transaction node B may determine whether the verification succeeds.

At step 412, if a verification result is successful, the transaction node B may initiate a transaction request to write the proof data and the transaction root carrying the signatures of the transaction initiator and the transaction receiver on the blockchain, for a node in the blockchain to perform consensus verification on the transaction root and the proof data, and approve or reject the transaction request according to the verification result.

At step 414, a consensus node may perform verification on the transaction root to obtain a first verification result, and perform verification on the proof data according to the transaction root to obtain a second verification result. An implementation of step 414 may be as follows: determining an address associated with an output transaction root in the transaction root. The output transaction root may be constructed according to post-transaction data in the transaction data; and if determining that a quantity of obtained addresses is greater than or equal to a predetermined threshold, verifying whether the transaction root carries the signatures corresponding to the transaction initiator and the transaction receiver. The predetermined threshold may be 2.

Each output transaction root may have a corresponding address, and a node of a transaction participant may be determined based on the address; next, whether all the nodes of the transaction participants sign on the transaction root will be verified. If the transaction root is signed and valid, the first verification result is successful.

At step 416, the method may include approving or rejecting the transaction request according to the first verification result and the second verification result.

Accordingly, in this embodiment, at first, the one-way function is used to ensure that the transaction data is authentic and cannot be tampered with. Next, the proof data is constructed to prove validity of the information to be hidden without revealing any information to be hidden to a non-transaction participant. Compared with existing technologies, this embodiment can effectively prevent data privacy of the entire blockchain from being affected by a data leakage of any node, and improve data security of the blockchain.

Figure 5:
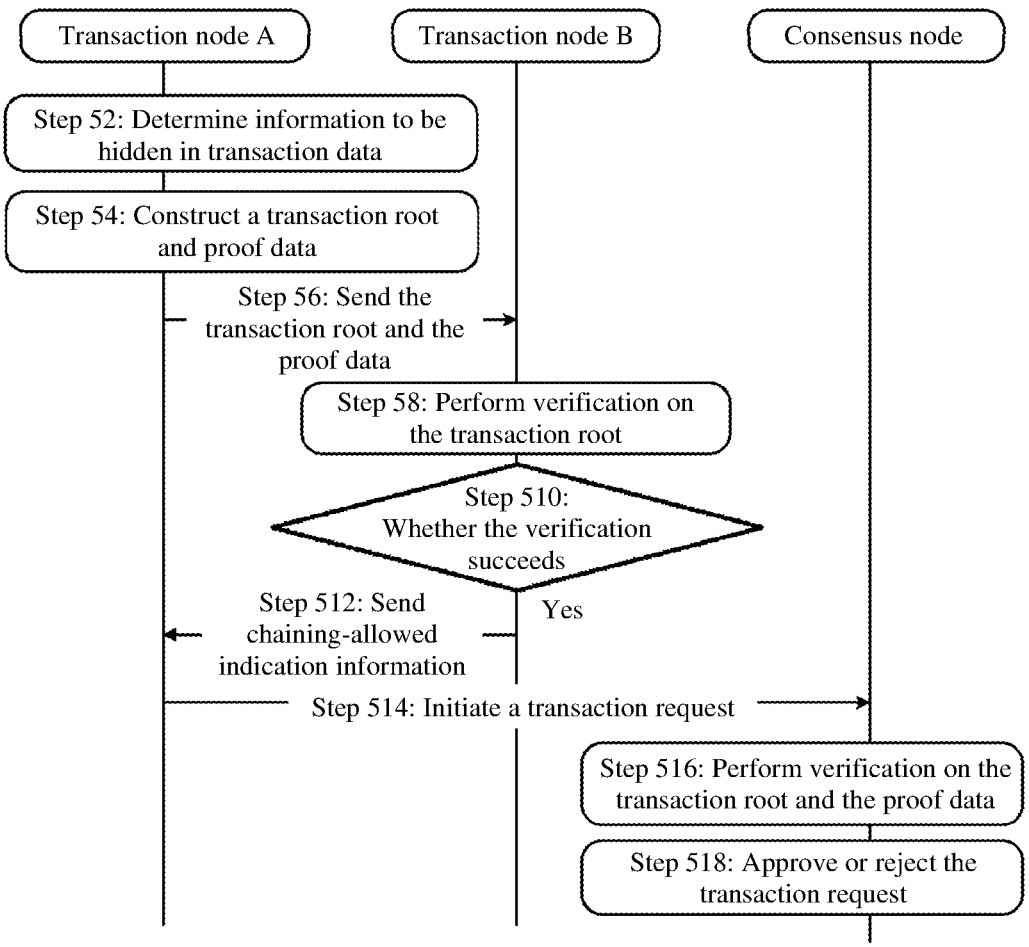
FIG. 5 is a schematic flowchart of a data processing method, according to an embodiment of the present specification.

Referring now to FIG. 5, FIG. 5 is a schematic flowchart of a data processing method, according to an embodiment of the present specification. As shown in FIG. 5, the method may be performed by a node in a blockchain, including the following steps.

At step 52, a transaction node A (a transaction initiator) may determine information to be hidden in transaction data.

At step 54, the transaction node A may obtain, by using the transaction data as an input of a predetermined one-way function, a transaction root that is output by the predetermined one-way function, and construct, according to the transaction root, proof data of validity of the information to be hidden.

At step 56, the transaction node A may send the transaction root and the proof data to a transaction node B (a transaction receiver), for the transaction receiver to perform verification on the transaction root, and after the verification succeeds, initiate a transaction request to write the proof data and the transaction root carrying signatures of the transaction initiator and the transaction receiver on a blockchain.

At step 58, the transaction node B may perform verification on the transaction root according to the information to be hidden and the predetermined one-way function.

At step 510, the transaction node B may determine whether the verification succeeds.

At step 512, if a verification result is successful, the transaction node B may sign on the transaction root, and send chaining-allowed indication information to the transaction node A.

At step 514, the transaction node A may initiate a transaction request to write the proof data and the transaction root carrying signatures of the transaction initiator and the transaction receiver on the blockchain.

At step 516, a consensus node may perform verification on the transaction root to obtain a first verification result, and perform verification on the proof data according to the transaction root to obtain a second verification result.

At step 518, the method may include approving or rejecting the transaction request according to the first verification result and the second verification result.

Accordingly, in this embodiment, at first, the one-way function is used to ensure that the transaction data is authentic and cannot be tampered with, and then the proof data is constructed to prove validity of the information to be hidden without revealing any information to be hidden to a non-transaction participant. Compared with existing technologies, this embodiment can effectively prevent data privacy of the entire blockchain from being affected by a data leakage of any node, and improve data security of the blockchain.

Figure 6A:
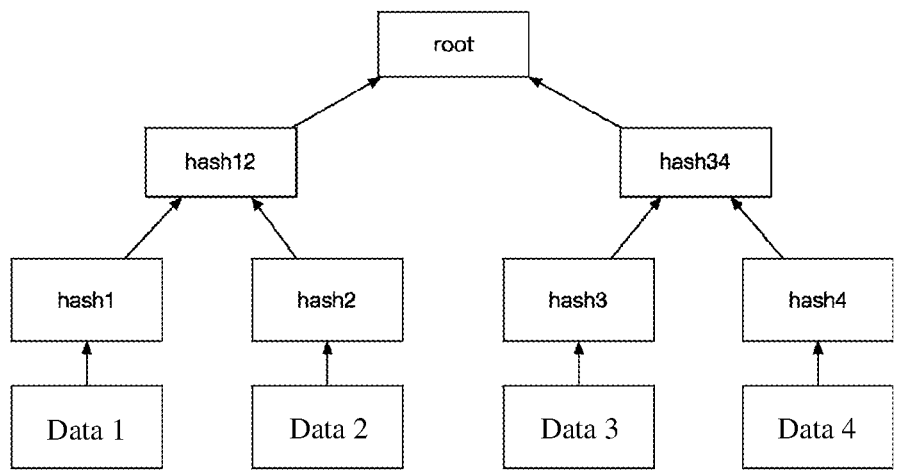
FIG. 6a is a flowchart of constructing a transaction root in a data processing method, according to an embodiment of the present specification.
Figure 6B:
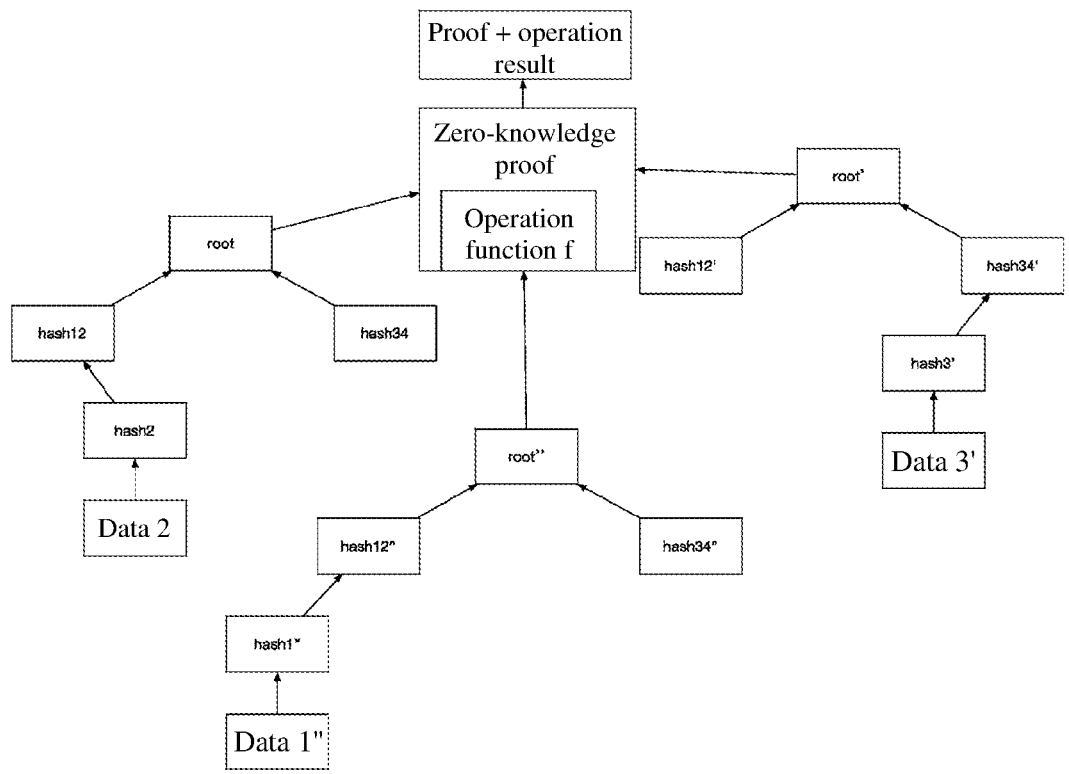
FIG. 6b is a flowchart of constructing proof data in a data processing method, according to an embodiment of the present specification.

Referring now to FIGS. 6a and 6b, the present specification is described below in detail by using an example, including the following steps.

At step S62, as shown in FIG. 6a, before a transaction is chained, a transaction in a blockchain may be organized into a hierarchical one-way function structure with a bottom layer being a plaintext of the transaction, and a transaction initiator may construct a tree shape by using a one-way function, to eventually form a transaction root. The plaintext may be used as information to be hidden.

Understandably, because all transaction content is organized by using the one-way function, chaining the transaction root does not leak any data privacy. In some embodiments, a transaction organization format may be any non-tree-shaped one-way function form.

At step S64, as shown in FIG. 6b, if a particular function f needs to be calculated by using transaction data, f may require input of data 2 of a transaction 1 (whose transaction root is root), data 3' of a transaction 2 (whose transaction root is root'), and data 1'' of a transaction 3 (whose transaction root is root'') as hidden information. That is, operation result=f(data 2, data 3', data 1''), root=transaction root (data 2), root'=transaction root (data 3'), and root''=transaction root (data 1''). The transaction initiator proof may prove that the above stated is correct by performing a zero-knowledge proof, without leaking the data 2, the data 3', or the data 1''.

The particular function f may be a function customized based on the hidden information to be proved. A function type is not limited as long as the proof can be implemented. For example, pre-transaction balances and post-transaction balances of two parties of the transaction are used as inputs to calculate a difference between the two; or pre-transaction and post-transaction balances of the transaction initiator are used as inputs to perform calculation to determine that a difference between the pre-transaction and post-transaction balances of the transaction initiator does not exceed m.

At step S66, after receiving the proof, a receiver (a transaction receiver or a non-transaction-participant node in the blockchain) may verify correctness of the proof by performing a zero-knowledge proof to confirm correctness of an operation result.

The receiver may know only the operation result. If the operation function does not leak information other than the operation result, the receiver may not know input data information of the function.

Accordingly, in this embodiment, one party may prove to another party that already-chained transaction content may be used to calculate the particular function, but operation of the function does not leak data privacy of any party. For the blockchain, the one-way function may ensure that data content is authentic and cannot be tampered with, and the zero-knowledge proof may ensure that a data operation process enables two parties to implement an agreed particular function, and that the data truly belongs to an already-chained transaction.

For brief description, the foregoing method embodiments are represented as a series of actions. However, persons skilled in the art should appreciate that the present invention is not limited to the described order of the actions, because according to the present invention, some steps may be performed in other orders or simultaneously. In addition, persons skilled in the art should also appreciate that the embodiments described in the present disclosure are exemplary embodiments, and an action involved is not necessarily mandatory to the embodiments of the present invention.

Figure 7:
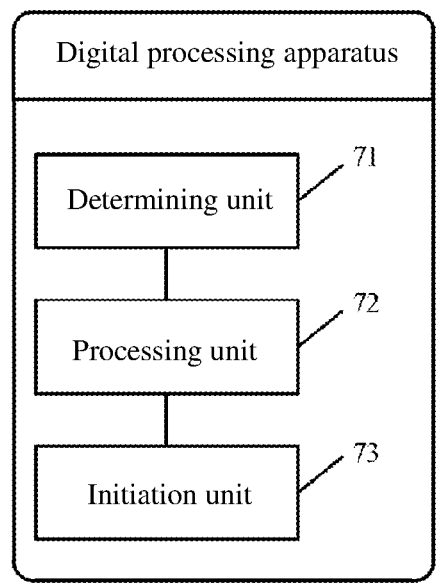
FIG. 7 is a block diagram of a data processing apparatus, according to an embodiment of the present specification.

Referring now to FIG. 7, FIG. 7 is a schematic structural diagram of a data processing apparatus, according to an embodiment of the present specification. As shown in FIG. 7, the apparatus may include: a determining unit 71, a processing unit 72, and an initiation unit 73.

The determining unit 71 may be configured to determine information to be hidden in transaction data. The processing unit 72 may be configured to obtain, by using the transaction data as an input of a predetermined one-way function, a transaction root that is output by the predetermined one-way function, and construct, according to the transaction root, proof data of validity of the information to be hidden. The initiation unit 73 may be configured to initiate a transaction request to write the proof data and the transaction root carrying a signature of the transaction initiator on a blockchain, for a node in the blockchain to perform consensus verification on the transaction root and the proof data, and approve or reject the transaction request according to a verification result.

In this embodiment, the determining unit 71 may be further configured to determine pre-transaction data and post-transaction data in the transaction data, where correspondingly, the processing unit 72 may be further configured to obtain, by using the pre-transaction data as an input of a first predetermined one-way function, an input transaction root that is output by the first predetermined one-way function; obtain, by using the post-transaction data as an input of a second predetermined one-way function, an output transaction root that is output by the second predetermined one-way function; and use the obtained input transaction root and output transaction root as to-be-chained transaction roots.

The processing unit 72 may be configured to construct a bottom layer of a predetermined one-way function tree according to the post-transaction data and a random number, and determine an output transaction root corresponding to a top layer of the predetermined one-way function tree. The processing unit 72 may be configured to perform a predetermined logical operation by using the transaction root and the information to be hidden as inputs, and perform a zero-knowledge proof on the logical operation by using the information to be hidden as a protected object to obtain the proof data.

Figure 8:
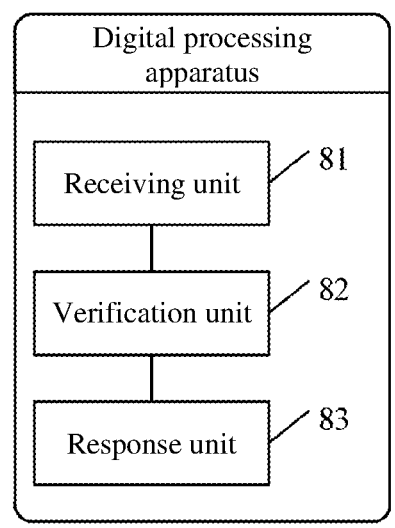
FIG. 8 is a block diagram of a data processing apparatus, according to an embodiment of the present specification.

Referring now to FIG. 8, FIG. 8 is a block diagram of a data processing apparatus, according to an embodiment of the present specification. Referring to FIG. 8, the apparatus may include: a receiving unit 81, a verification unit 82, and a response unit 83.

The receiving unit 81 may be configured to receive a transaction request from a transaction initiator. The transaction request may be a request to write a transaction root and proof data on a blockchain. The transaction root is obtained by using transaction data as an input of a predetermined one-way function, and the proof data is used to prove information to be hidden in the transaction data.

The verification unit 82 may be configured to perform verification on the transaction root, to obtain a first verification result, and perform verification on the proof data according to the transaction root, to obtain a second verification result.

The response unit 83 may be configured to approve or reject the transaction request according to the first verification result and the second verification result.

The verification unit 82 may further be configured to: verify whether the transaction root has a valid signature. Specifically, the verification unit 82 may be configured to determine an address associated with an output transaction root in the transaction root, where the output transaction root is constructed according to post-transaction data in the transaction data; and if a quantity of obtained addresses is determined to be 1, verify whether the transaction root has a signature corresponding to the transaction initiator; verify whether an output transaction root in the transaction root is the same as an already-chained output transaction root and input transaction root, where the output transaction root is constructed according to post-transaction data in the transaction data; and verify whether an input transaction root in the transaction root is the same as an already-chained output transaction root and input transaction root, where the input transaction root is constructed according to pre-transaction data in the transaction data.

The response unit 83 may be configured to: if the first verification result and the second verification result both are successful, in response to the transaction request, write the transaction root carrying a signature of the transaction initiator and the proof data on the blockchain; or if the first verification result and/or the second verification result is failed, reject the transaction request.

Figure 9:
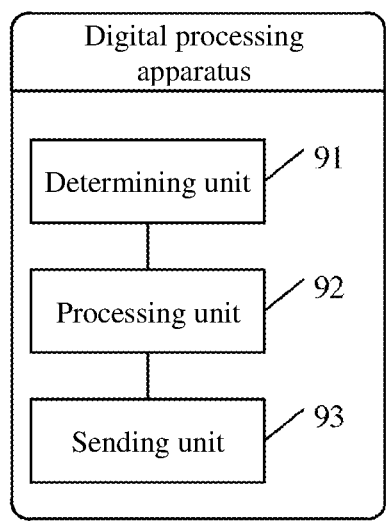
FIG. 9 is a block diagram of a data processing apparatus, according to an embodiment of the present specification.

Referring now to FIG. 9, FIG. 9 is a block diagram of a data processing apparatus, according to an embodiment of the present specification. As shown in FIG. 9, the apparatus may include: a determining unit 91, a processing unit 92, and a sending unit 93.

The determining unit 91 may be configured to determine, by a transaction initiator, information to be hidden in transaction data. The processing unit 92 may be configured to obtain, by using the transaction data as an input of a predetermined one-way function, a transaction root that is output by the predetermined one-way function, and construct, according to the transaction root, proof data of validity of the information to be hidden. The sending unit 93 may be configured to send the transaction root and the proof data to a transaction receiver, for the transaction receiver to perform verification on the transaction root, and after the verification succeeds, initiate a transaction request to write the proof data and the transaction root carrying signatures of the transaction initiator and the transaction receiver on a blockchain.

Figure 10:
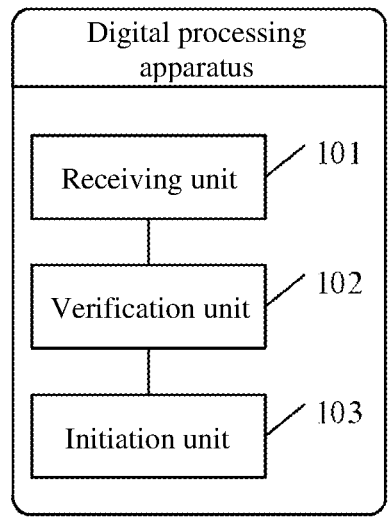
FIG. 10 is a block diagram of a data processing apparatus, according to an embodiment of the present specification.

Referring to FIG. 10, FIG. 10 is a block diagram of a data processing apparatus, according to an embodiment of the present specification. As shown in FIG. 10, the apparatus may include: a receiving unit 101, a verification unit 102, and an initiation unit 103.

The receiving unit 101 may be configured to receive a transaction root and proof data from a transaction sender. The transaction root may be obtained by using transaction data as an input of a predetermined one-way function, and the proof data may be used to prove information to be hidden in the transaction data. The verification unit 102 may be configured to perform verification on the transaction root according to the information to be hidden and the predetermined one-way function. The initiation unit 103 may be configured to: if a verification result is success, initiate a transaction request to write the proof data and the transaction root carrying signatures of the transaction initiator and the transaction receiver on a blockchain, for a node in the blockchain to perform consensus verification on the transaction root and the proof data, and approve or reject the transaction request according to the verification result.

Figure 11:
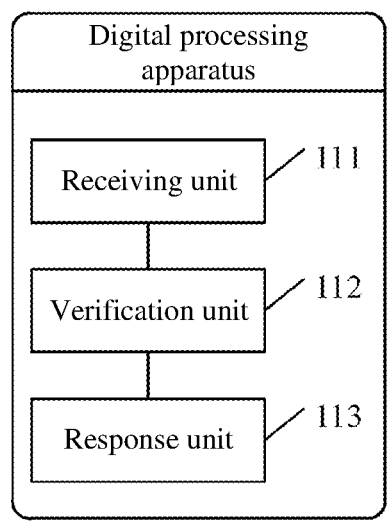
FIG. 11 is a block diagram of a data processing apparatus, according to an embodiment of the present specification.

Referring now to FIG. 11, FIG. 11 is a block diagram of a data processing apparatus, according to an embodiment of the present specification. As shown in FIG. 11, the apparatus may include: a receiving unit 111, a verification unit 112, and a response unit 113.

The receiving unit 111 may be configured to receive a transaction request from a transaction receiver. The transaction request may be a request to write a transaction root and proof data on a blockchain. The transaction root may be obtained by using transaction data initiated by a transaction initiator as an input of a predetermined one-way function, and the proof data may be used to prove information to be hidden in the transaction data.

The verification unit 112 may be configured to perform verification on the transaction root to obtain a first verification result, and perform, according to the transaction root, verification on the proof data to obtain a second verification result.

The response unit 113 may be configured to approve or reject the transaction request according to the first verification result and the second verification result.

The verification unit 112 may be further configured to determine an address associated with an output transaction root in the transaction root, where the output transaction root is constructed according to post-transaction data in the transaction data; and if a quantity of obtained addresses is determined to be greater than or equal to a predetermined threshold, verify whether the transaction root carries signatures corresponding to the transaction initiator and the transaction receiver.

The apparatus embodiments are similar to the method embodiments described above, which can be referred to the descriptions in the method embodiments. It should be noted that among the components of the apparatus of the present invention, the components are logically divided according to the functions to be implemented by the components, but the present invention is not limited thereto, and the components may be redivided or combined as required.

Figure 12:
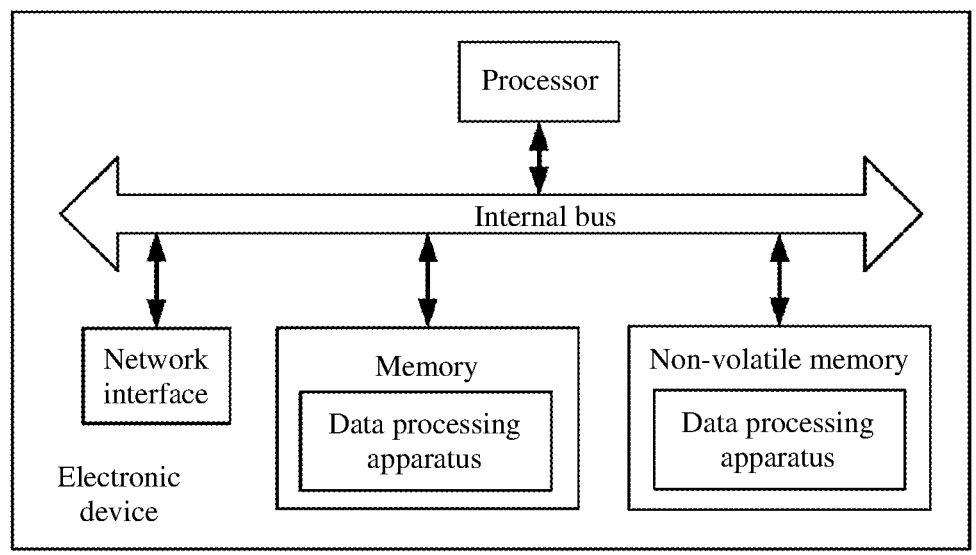
FIG. 12 is a diagram of an example electronic device, according to an embodiment of the present specification.

FIG. 12 is a schematic structural diagram of an electronic device, according to an embodiment of the present specification. As shown in FIG. 12, the electronic device includes a processor, an internal bus, a network interface, an internal memory, and a non-volatile memory, and certainly may further include other hardware necessary to services. The processor reads a corresponding computer program from the non-volatile memory, loads the computer program to the internal memory, and then runs the computer program, to logically form a data processing apparatus. Certainly, in addition to the software implementation, the present specification does not exclude other implementations, such as a logical device or a combination of hardware and software. That is, an entity for performing the following processing procedure is not limited to the logical units, but may be hardware or a logical device.

The network interface, the processor, and the memory may be connected to each other by using a bus system. The bus may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, the bus is represented only by a double-sided arrow in FIG. 12, but it does not mean that there is only one bus or one type of bus.

The memory is configured to store a program. Specifically, the program may include program code, and the program code includes a computer operation instruction. The memory may include a read-only memory (ROM) and a random access memory (RAM), and provides instructions and data to the processor. The memory may include a high-speed RAM, and may also include a non-volatile memory, such as at least one disk storage.

The processor is configured to execute the program stored in the memory, and specifically configured to: determine information to be hidden in transaction data; obtain, by using the transaction data as an input of a predetermined one-way function, a transaction root that is output by the predetermined one-way function, and construct, according to the transaction root, proof data of validity of the information to be hidden; and initiate a transaction request to write the proof data and the transaction root carrying a signature of the transaction initiator on a blockchain, for a node in the blockchain to perform consensus verification on the transaction root and the proof data, and approves or reject the transaction request according to a verification result.

The processor is further configured to: receive a transaction request from a transaction initiator, where the transaction request is used to request to write a transaction root and proof data to a blockchain, the transaction root is obtained by using transaction data as an input of a predetermined one-way function, and the proof data is used to prove information to be hidden in the transaction data; perform verification on the transaction root, to obtain a first verification result, and perform, according to the transaction root, verification on the proof data to obtain a second verification result; and approve or reject the transaction request according to the first verification result and the second verification result.

The processor is further configured to: determine information to be hidden in transaction data; obtain, by using the transaction data as an input of a predetermined one-way function, a transaction root that is output by the predetermined one-way function, and construct, according to the transaction root, proof data of validity of the information to be hidden; and send the transaction root and the proof data to a transaction receiver, so that the transaction receiver performs verification on the transaction root, and after the verification succeeds, initiates a transaction request to write the proof data and the transaction root carrying signatures of the transaction initiator and the transaction receiver on a blockchain.

The processor is further configured to: receive a transaction root and proof data from a transaction sender, where the transaction root is obtained by using transaction data as an input of a predetermined one-way function, and the proof data is used to prove information to be hidden in the transaction data; perform verification on the transaction root according to the information to be hidden and the predetermined one-way function; and if a verification result is successful, initiate a transaction request to write the proof data and the transaction root carrying signatures of the transaction initiator and the transaction receiver on a blockchain, for a node in the blockchain to perform consensus verification on the transaction root and the proof data, and approve or reject the transaction request according to a verification result.

The processor is further configured to: receive a transaction request from a transaction receiver, where the transaction request is used to request to write a transaction root and proof data on a blockchain, the transaction root is obtained by using transaction data initiated by a transaction initiator as an input of a predetermined one-way function, and the proof data is used to prove information to be hidden in the transaction data; perform verification on the transaction root to obtain a first verification result, and perform verification on the proof data according to the transaction root to obtain a second verification result; and approve or reject the transaction request according to the first verification result and the second verification result.

The methods executed by the data processing apparatuses or a masternode disclosed in the embodiments shown in FIG. 2 to FIG. 10 of the present specification may be applied to the processor, or implemented by the processor. The processor may be an integrated circuit chip and has a signal processing capability. In an implementation process, the steps of the foregoing method may be implemented by using a hardware integrated logic circuit in the processor or instructions in a form of software. The processor may be a general purpose processor, including a central processing unit (CPU), a network processor (NP), and the like; or may be a digital signal processor (DSP), an application-specific integrated circuit (ASIC), a field-programmable gate array (FPGA), or another programmable logic device, discrete gate or transistor logic device, or discrete hardware component. The processor may implement or execute methods, steps, and logical block diagrams disclosed in the embodiments of the present specification. The main purpose processor may be a microprocessor, or the processor may be any conventional processor or the like. The steps in the methods disclosed in the embodiments of the present specification may be directly implemented by a hardware decoding processor, or may be implemented by a combination of hardware and software modules in a decoding processor. The software module may be located in a mature storage medium in the art, such as a RAM, a flash memory, a read-only memory (ROM), a programmable ROM, an electrically erasable programmable memory, or a register. The storage medium is located in the memory. The processor reads information in the memory, and complete the steps of the method by using hardware thereof.

The data processing apparatus may further execute the methods in FIG. 2 to FIG. 5, and implement the method executed by the masternode.

Based on the same invention idea, this embodiment of the present specification further provides a computer readable storage medium. The computer readable storage medium may store one or more programs, and when the one or more programs are executed by an electronic device including a plurality of application programs, the electronic device may be enabled to perform the data processing methods provided in FIG. 2 to FIG. 6.

The embodiments in this specification are all described in a progressive manner, for same or similar parts in the embodiments, refer to these embodiments, and descriptions of each embodiment focus on a difference from other embodiments. Especially, a system embodiment is similar to a method embodiment, which may referred to the description in the method embodiment.

Embodiments of this specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings do not necessarily require specific sequences or consecutive sequences to achieve an expected result. In some implementations, multitasking and parallel processing may be feasible or beneficial.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowchart and/or block diagram of the method, device (system), and computer program product of the embodiments of the present invention. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include a form such as a persistent memory, a random-access memory (RAM) and/or a non-volatile memory of computer readable media, for example, a read-only memory (ROM) or a flash memory (RAM). The memory is an example of the computer readable medium.

The computer readable medium includes a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present invention, the computer-readable medium does not include transitory computer readable media (transitory media), such as a modulated data signal and a carrier.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

A person skilled in the art should understand that the embodiments in the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The foregoing descriptions are merely embodiments in the present invention and are not intended to limit the present invention. For a person skilled in the art, various modifications and variations can be made to the present invention. Any modification, equivalent replacement, or improvement made within the spirit and principle of the present invention shall subject to the claims of the present invention.

What is claimed is:

1. A data processing method, comprising:
   determining, by a computing device of a transaction initiator, information to be hidden in transaction data;
   determining pre-transaction data and post-transaction data in the transaction data;
   obtaining, by using the pre-transaction data as an input of a first predetermined one-way function, an input transaction root that is output by the first predetermined one-way function;
   obtaining, by using the post-transaction data as an input of a second predetermined one-way function, an output transaction root that is output by the second predetermined one-way function, wherein the output transaction root is obtained by:
   constructing, according to the post-transaction data and a random number, a bottom layer of a predetermined one-way function tree, and
   determining the output transaction root corresponding to a top layer of the predetermined one-way function tree;
   constructing, according to the input transaction root and the output transaction root, proof data of validity of the information to be hidden; and
   sending, by the computing device of the transaction initiator, the input transaction root, the output transaction root, and the proof data to a computing device of a transaction receiver for the computing device of the transaction receiver to perform verification on the input transaction root and the output transaction root, and to initiate, after the verification succeeds, a transaction request to write the proof data and input transaction root and the output transaction root carrying signatures of the transaction initiator and the transaction receiver on a blockchain.

2. The method according to claim 1, wherein the constructing, according to the input transaction root and the output transaction root, proof data of validity of the information to be hidden comprises:
   performing, by using the input transaction root, the output transaction root, and the information to be hidden as inputs, a predetermined logical operation; and
   performing, by using the information to be hidden as a protected object, a zero-knowledge proof on the logical operation to obtain the proof data.

3. The method according to claim 1, wherein the second predetermined one-way function comprises the predetermined one-way function tree.

4. The method according to claim 1, wherein determining information to be hidden in the transaction data comprises determining information to be hidden in the transaction data according to a hiding rule, the hiding rule comprising selecting data corresponding to one or more key words.

5. The method according to claim 4, wherein the one or more key words comprise "balance" and "transaction amount".

6. The method according to claim 1, wherein determining information to be hidden in the transaction data comprises determining information to be hidden in the transaction data according to a hiding rule, the hiding rule comprising determining an item in the transaction data corresponding to a predetermined hidden item and content of the item as information to be hidden.

7. The method according to claim 6, wherein the predetermined hidden item comprises pre-transaction and post-transaction balances.

8. The method according to claim 1, wherein determining information to be hidden in the transaction data comprises: determining and labeling, by the computing device of the transaction initiator, information to be hidden in transaction data.

9. One or more non-transitory computer-readable storage media configured with instructions executable by one or more processors to cause the one or more processors to perform operations comprising:
   determining information to be hidden in transaction data;
   determining pre-transaction data and post-transaction data in the transaction data;
   obtaining, by using the pre-transaction data as an input of a first predetermined one-way function, an input transaction root that is output by the first predetermined one-way function;
   obtaining, by using the post-transaction data as an input of a second predetermined one-way function, an output transaction root that is output by the second predetermined one-way function, wherein the output transaction root is obtained by:
      constructing, according to the post-transaction data and a random number, a bottom layer of a predetermined one-way function tree, and
      determining the output transaction root corresponding to a top layer of the predetermined one-way function tree;
   constructing, according to the input transaction root and the output transaction root, proof data of validity of the information to be hidden; and
   sending the input transaction root, the output transaction root, and the proof data to a computing device of a transaction receiver for the computing device of the transaction receiver to perform verification on the input transaction root and the output transaction root, and to initiate, after the verification succeeds, a transaction request to write the proof data and input transaction root and the output transaction root carrying signatures of a transaction initiator and the transaction receiver on a blockchain.

10. The one or more non-transitory computer-readable storage media of claim 9, wherein the constructing, according to the input transaction root and the output transaction root, proof data of validity of the information to be hidden comprises:
   performing, by using the input transaction root and the output transaction root and the information to be hidden as inputs, a predetermined logical operation; and
   performing, by using the information to be hidden as a protected object, a zero-knowledge proof on the logical operation to obtain the proof data.

11. The one or more non-transitory computer-readable storage media according to claim 9, wherein the second predetermined one-way function comprises the predetermined one-way function tree.

12. The one or more non-transitory computer-readable storage media according to claim 9, wherein determining information to be hidden in the transaction data comprises determining information to be hidden in the transaction data according to a hiding rule, the hiding rule comprising selecting data corresponding to one or more key words.

13. The one or more non-transitory computer-readable storage media according to claim 9, wherein determining information to be hidden in the transaction data comprises determining information to be hidden in the transaction data according to a hiding rule, the hiding rule comprising determining an item in the transaction data corresponding to a predetermined hidden item and content of the item as information to be hidden.

14. The one or more non-transitory computer-readable storage media according to claim 13, wherein the predetermined hidden item comprises pre-transaction and post-transaction balances.

15. An apparatus comprising:
   one or more processors; and
   a memory storing instructions executable by the one or more processors to cause the one or more processors to perform operations comprising:
   determining information to be hidden in transaction data;
   determining pre-transaction data and post-transaction data in the transaction data;
   obtaining, by using the pre-transaction data as an input of a first predetermined one-way function, an input transaction root that is output by the first predetermined one-way function;
   obtaining, by using the post-transaction data as an input of a second predetermined one-way function, an output transaction root that is output by the second predetermined one-way function, wherein the output transaction root is obtained by:
      constructing, according to the post-transaction data and a random number, a bottom layer of a predetermined one-way function tree, and
      determining the output transaction root corresponding to a top layer of the predetermined one-way function tree;
   constructing, according to the input transaction root and the output transaction root, proof data of validity of the information to be hidden; and
   sending the input transaction root, the output transaction root, and the proof data to a computing device of a transaction receiver for the computing device of the transaction receiver to perform verification on the input transaction root and the output transaction root, and to initiate, after the verification succeeds, a transaction request to write the proof data and input transaction root and the output transaction root carrying signatures of a transaction initiator and the transaction receiver on a blockchain.

16. The apparatus according to claim 15, wherein the constructing, according to the input transaction root and the output transaction root, proof data of validity of the information to be hidden comprises:
   performing, by using the input transaction root and the output transaction root and the information to be hidden as inputs, a predetermined logical operation; and performing, by using the information to be hidden as a protected object, a zero-knowledge proof on the logical operation to obtain the proof data.

17. The apparatus according to claim 15, wherein the second predetermined one-way function comprises the predetermined one-way function tree.

18. The apparatus according to claim 15, wherein determining information to be hidden in the transaction data comprises determining information to be hidden in the transaction data according to a hiding rule, the hiding rule comprising selecting data corresponding to one or more key words.

19. The apparatus according to claim 15, wherein determining information to be hidden in the transaction data comprises determining information to be hidden in the transaction data according to a hiding rule, the hiding rule comprising determining an item in the transaction data corresponding to a predetermined hidden item and content of the item as information to be hidden.

20. The apparatus according to claim 19, wherein the predetermined hidden item comprises pre-transaction and post-transaction balances.

\* \* \* \* \*